United States Patent
Hori et al.

(10) Patent No.: US 7,236,199 B2
(45) Date of Patent: Jun. 26, 2007

(54) MULTI-TAP CAMERA

(76) Inventors: Toshikazu Hori, 1698 Yosemite Dr., Milpitas, CA (US) 95035; Chik Bor (Paul) Cheng, 2240 Coolidge Ave., #1, Oakland, CA (US) 94602; Hai (Jonathan) Lin, 4444 Central Ave., #318, Fremont, CA (US) 94536

( * ) Notice: Subject to any disclaimer, the term of this patent is extended or adjusted under 35 U.S.C. 154(b) by 742 days.

(21) Appl. No.: 10/615,052

(22) Filed: Jul. 7, 2003

(65) Prior Publication Data

US 2005/0007475 A1 Jan. 13, 2005

(51) Int. Cl.
*H04N 5/335* (2006.01)

(52) U.S. Cl. ........................ 348/321; 348/243

(58) Field of Classification Search ............... 348/323, 348/321, 218.1, 246, 243, 255, 257
See application file for complete search history.

(56) References Cited

U.S. PATENT DOCUMENTS 5,737,015 A * 4/1998 Juen ..................... 348/230.1
6,552,744 B2 * 4/2003 Chen ..................... 348/218.1
6,791,615 B1 * 9/2004 Shiomi et al. ............ 348/323
7,050,098 B2 * 5/2006 Shirakawa et al. ......... 348/245

* cited by examiner

*Primary Examiner*—Vivek Srivastava
*Assistant Examiner*—Gevell Selby
(74) *Attorney, Agent, or Firm*—Law Offices of Thomas E. Schatzel

(57) ABSTRACT

A camera comprises a multitap imager, separate digitizing channels for each imager tap, adjustments for channel gain and black level, a pattern generator, and a channel balancer. The channel balancer compares adjacent pixels and sums the differences in levels over many frames. Any accumulated difference is used as a feedback signal to drive the summing to a minimum. If the imager is temporarily hooded, the feedback is used to balance black levels between the channels. If the imager is operating, the feedback is used to dynamically adjust the channel gain of one channel to match the other. A pattern generator is used once during calibration to generate a test pattern in the digitizing channels that makes it obvious to a framegrabber how exactly to restitching the various lanes or zones of the whole image frame back together.

3 Claims, 2 Drawing Sheets

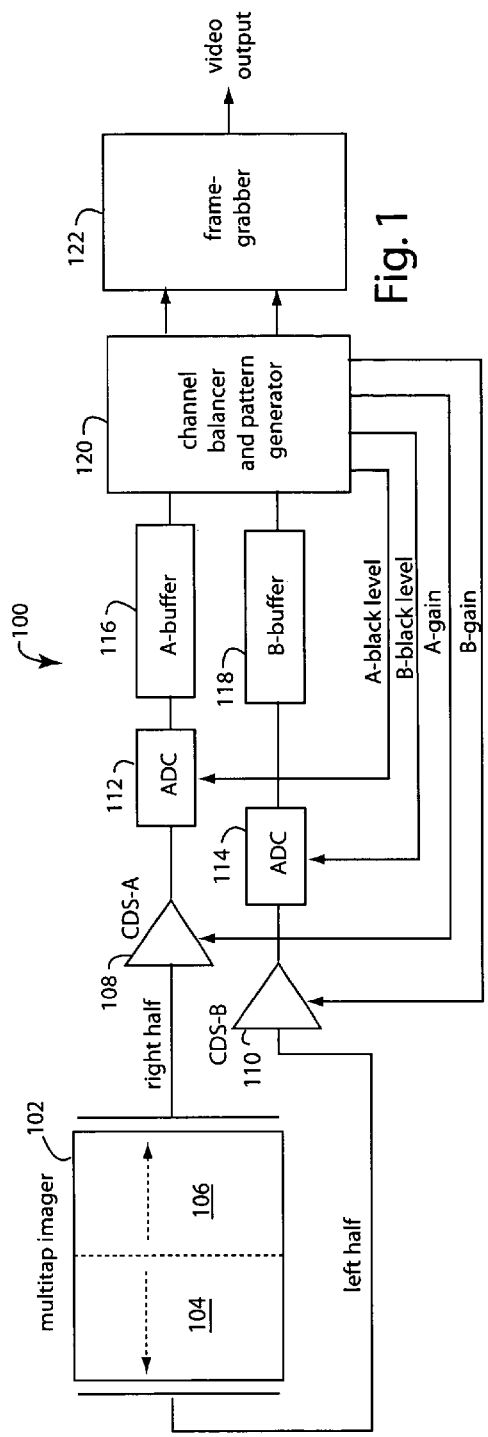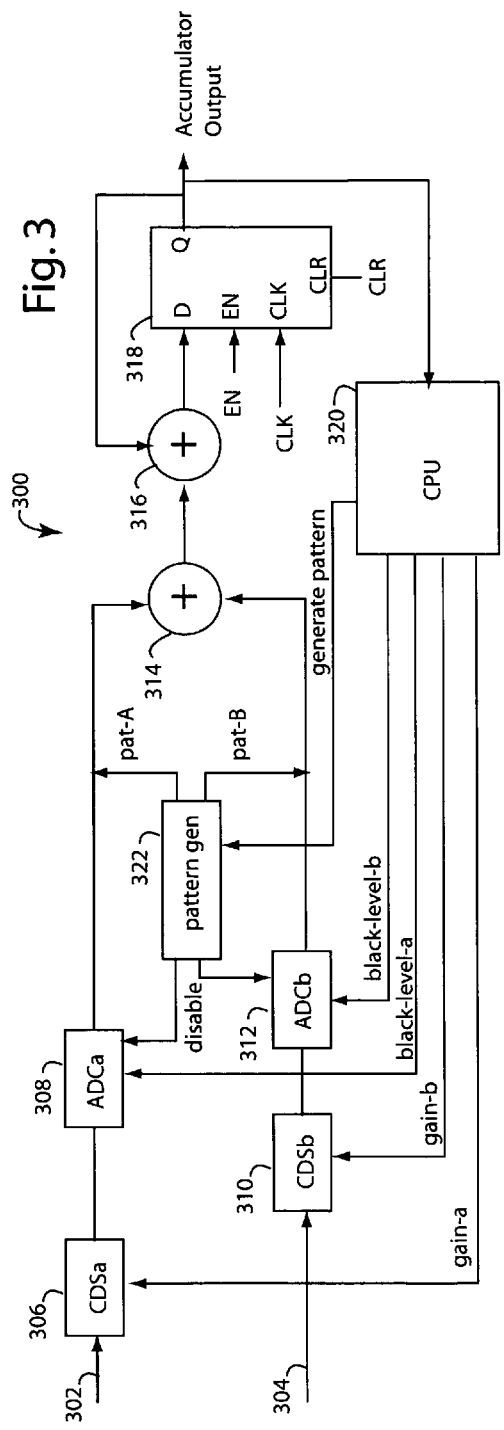

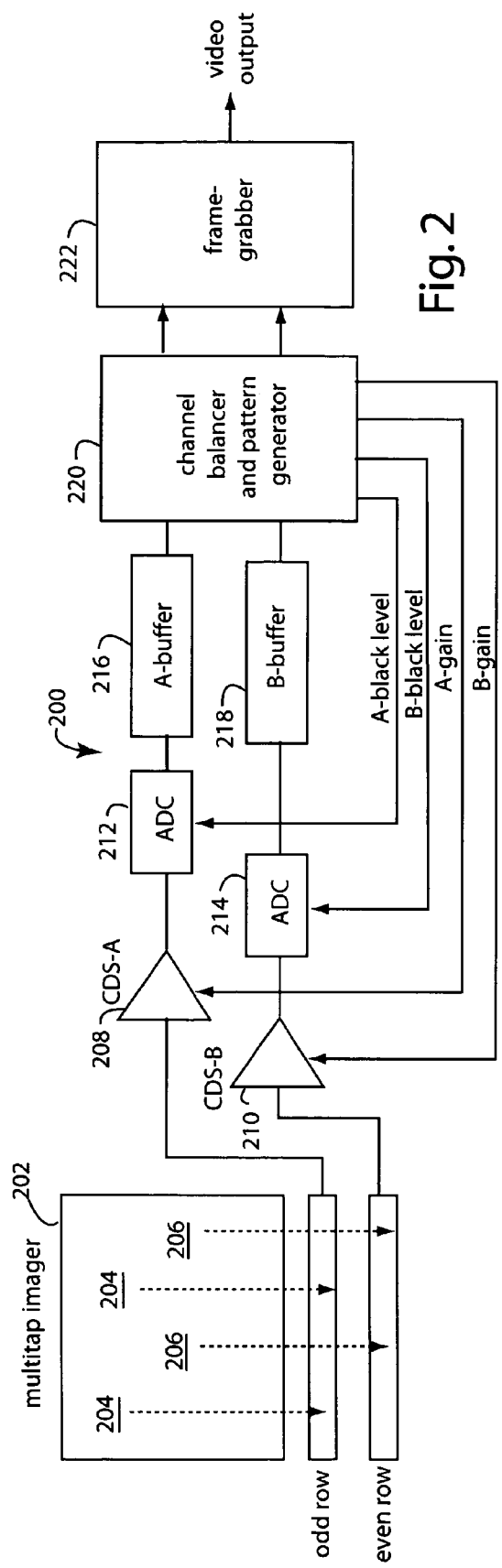

MULTI-TAP CAMERA

FIELD OF THE INVENTION

The present invention relates to digital cameras, and more specifically to multitap imagers and circuits to correct image banding and frame restitching errors.

BACKGROUND OF THE INVENTION

Charge coupled device (CCD) and complementary metal oxide semiconductor (CMOS) cameras are being developed with higher resolution and faster frame rates. Both such goals can conflict in the design and operation of a CCD because the increase in pixels needed to get higher resolution means each row or column of pixels will take longer to serially clock out. Higher speeds demand that the pixels for each frame clock out quicker, not take longer to complete.

So the multitap CCD structure was developed that splits the image frame into two or more areas that are clocked out in parallel. For example, a frame can be divided into left and right halves and the pixels in each half serially clocked out to the nearest side edge. Alternatively, rows can be divided into even and odd, and separately clocked into even/odd row buffers.

Two problems result in practice when trying to use multitap CCD imagers. First, there will be subtle differences in the gain and black levels for each group of separately clocked out pixels. When the image is reconstructed, the eye will easily recognize any differences as shade banding. Second, small mismatches or incompatibilities in the imager to the framegrabber can interfere with the accurate restitching of the image frame sections back together. The restitching can have an extra row or column of pixels, or one can be missing. This problem is usually only present when mating a new camera to a new framegrabber. Once the details of the match have been settled between the camera and frame grabber manufacturers, the restitching problem is permanently solved. But it can appear again with minor revisions to the design or manufacturing of either the camera or the framegrabber.

SUMMARY OF THE INVENTION

An object of the present invention is to provide a multitap camera with a minimum of shading bands and lane/zone restitching artifacts.

Briefly, a camera embodiment of the present invention comprises a multitap imager, separate digitizing channels for each imager tap, adjustments for channel gain and black level, a pattern generator, and a channel balancer. The channel balancer compares adjacent pixels and sums the differences in levels over many frames. Any accumulated difference is used as a feedback signal to drive the summing to a minimum. If the imager is temporarily hooded, the feedback is used to balance black levels between the channels. If the imager is operating, the feedback is used to dynamically adjust the channel gain of one channel to match the other. A pattern generator is used once during calibration to generate a test pattern in the digitizing channels that makes it obvious to a framegrabber how exactly to restitching the various lanes or zones of the whole image frame back together.

An advantage of the present invention is that a camera is provided that mates well with multitap framegrabbers.

Another advantage of the present invention is that a multitap imager is provided with automatically balanced digitizing channels.

These and other objects and advantages of the present invention will no doubt become obvious to those of ordinary skill in the art after having read the following detailed description of the preferred embodiment as illustrated in the drawing figures.

DESCRIPTION OF THE DRAWINGS

FIG. 1 is a schematic diagram of a multitap-sensor camera embodiment of the present invention in which left and right zone taps are implemented in the imager;

FIG. 2 is a schematic diagram of a multitap-sensor camera embodiment of the present invention in which even and odd row taps are implemented in the imager; and FIG. 3 is a schematic diagram of a digital channel difference accumulator and pattern generator useful in the cameras of FIGS. 1 and 2.

DETAILED DESCRIPTION OF THE EMBODIMENTS

FIG. 1 represents a multitap-sensor camera embodiment of the present invention, and is referred to herein by the general reference numeral 100. A multitap imager 102 has two zones of pixels, a left zone 104 and a right zone 106. If the imager were array of 2048×2048 pixels, for example, then pixels 1-1023 would clock out serially on the left side in parallel to pixels 2048-1024 which clock out from the right side. At the vertical zone-division in the middle, for every row, pixel-1023 on the left and pixel-1024 on the right are the last on each side respectively to serially clock out. However, when zones 104 and 106 are restitched back together, e.g., in a framegrabber, these pixels are supposed to be adjacent to each other. The pixels next to each other in pixel column-1023 and column-1024 are assumed herein to provide the best clues as to the correct gain and black level balance between the left and right zones.

The multitap-sensor camera 100 further comprises pair correlated double sampling (CDS) amplifiers 108 and 110, analog-to-digital converters (ADC's) 112 and 114, and buffers 116 and 118. Each buffer registers all the digitized pixels for corresponding rows in the two zones and presents them to a channel balancer and pattern generator field programmable logic array (FPGA) 120.

The FPGA 120 includes firmware to estimate the relative black level balance differences between the left and right zones 102 and 104. The black level balance is estimated when the imager 102 is hooded or shut-off from all light. The black-level reference voltage applied to either the A-side ADC 112 or B-side ADC 114 is adjusted to result in the same digitized values, on average, between pixels in column-1023 and column-1024. Once the best balance is found, it can be permanently fixed by the firmware, or dynamically balanced during operation.

The FPGA 120 further includes firmware to dynamically estimate the relative gain differences between the left and right zones 102 and 104. The gain level balance is estimated by accumulating the sums of the differences between adjacent pixels. Feedback is provided to either of CDS 108 and 110 to control the gain of one channel to match a fixed value for the other.

A framegrabber 122 reassembles the digitized A-channel and B-channel representing the balanced zones 104 and 106 into a whole image frame.

The reassembled image frame may have a misregistrations of one or two pixel columns at the reconstructed joint between zones 104 and 106. This can occur in practice when the framegrabber 122 is not an intrinsic part of the rest of camera 100. Such is a frequent occurrence when the framegrabber is a new product by a third party manufacturer.

A pattern generator portion of FPGA 120 is turned on during a factory calibration procedure in order to tweak the framegrabber image restitching in the camera configuration process. Such pattern can comprise a simple slope in grayscale from left to right. A misregistration will be displayed as an artifact, e.g., a black or white vertical line down the center of the image.

FIG. 2 represents another multitap-sensor camera embodiment of the present invention, and is referred to herein by the general reference numeral 200. A multitap imager 202 has odd and even row outputs 204 and 206. The pixels next to each other above and below in each column are assumed herein to provide the best clues as to the correct gain and black level balance between the rows.

As in FIG. 1, the multitap-sensor camera 200 further comprises pair correlated double sampling (CDS) amplifiers 208 and 210, analog-to-digital converters (ADC's) 212 and 214, and buffers 216 and 218. Each buffer registers all the digitized pixels for corresponding rows, and presents them to a channel balancer and pattern generator field programmable logic array (FPGA) 220.

The FPGA 220 includes firmware to estimate the relative black level balance differences between the odd/even rows 202 and 204. The black level balance is estimated when the imager 202 is hooded or shut-off from all light. The black-level reference voltage applied to either the A-side ADC 212 or B-side ADC 214 is adjusted to result in the same digitized values, on average, between pixels in adjacent rows. Once the best balance is found, it can be permanently fixed by the firmware, or dynamically balanced during operation.

The FPGA 220 further includes firmware to dynamically estimate the relative gain differences between the odd/even rows 202 and 204. The gain level balance is estimated by accumulating the sums of the differences between adjacent pixels in the same columns. Feedback is provided to either of CDS 208 and 210 to control the gain of one channel to match a fixed value for the other.

A framegrabber 222 reassembles the digitized A-channel and B-channel representing the balanced odd/even rows 204 and 206 into a whole image frame. As such, horizontal banding is eliminated.

The reassembled image frame may have misregistrations of one or two pixel columns between odd/even rows 204 and 206. This can occur when the framegrabber 222 is not a part of the rest of camera 200. Such is a common occurrence when the framegrabber is a new product by a third party manufacturer.

A pattern generator portion of FPGA 220 is turned on during a factory calibration procedure in order to tweak the framegrabber image restitching. Such pattern can comprise a simple slope in grayscale from left to right. A misregistration will be displayed as an artifact, e.g., a zigzag in grayscale tones.

Auto channel balance recognizes that for any two adjacent pixels, their output values may not be necessarily equal given the same optical input. Different pixels often image different portions of a scene, so it is hard to tell automatically what artificial differences exist in the output values as a result of imbalances. The present inventors have discovered that if the output values of two adjacent pixels are accumulated over time, any difference in each pixel's average value can be attributed to imbalance. The difference in averages can therefore be used as a feedback control signal to balance the respective channels.

FIG. 3 illustrates a channel-difference accumulator and pattern generator 300 that can be used in the multitap-sensor cameras 100 and 200, in FIGS. 1 and 2. A channel-difference accumulator part is used to accumulate selected pixel pairs from odd and even lines of whole frames, and also the two center columns in left-right split multitap designs. Once a full frame has been accumulated, the respective gains and black levels in each channel are adjusted to find a minimum accumulation difference. The channel-difference accumulator 300 can be implemented by providing a channel-A input 302 and a channel-B input 304. A first correlated double sampling (CDS) amplifier 306 has an adjustable gain and drives a first analog-to-digital converter (ADC) 308. A reference voltage adjustment allows the black level to be set. Similarly, a second CDS amplifier 310 drives a second ADC 312. The respective digital outputs are input to a subtractor/adder 314 and a difference is passed to another subtractor/adder 316. This outputs to a D-type flip-flop 318. An accumulator output is then available to a processor (CPU) 320 that interprets how to adjust the gains and black levels to result in a minimum accumulated difference between the A and B channels. The advantage of the digital design of channel-difference accumulator 300 is its relative insensitivity to variations in component operation and error voltages. It would be possible to implement an analog based channel-difference accumulator, but such is not preferred.

The CPU 320 decides when to generate a test pattern for each channel. It does this by sending a control signal to a pattern generator 322. A disable signal is issued to the ADC's 308 and 312, and the pattern generator 322 digitally injects respective pattern-A and pattern-B on the ADC outputs. Such outputs are then forwarded to a frame grabber, as in FIGS. 1 and 2.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A multi-tap camera, comprising:

a multi-tap imager with a plurality of output taps;

a plurality of separate digitizing channels for each imager output tap;

an adjustment for channel gain and black level; and a channel balancer for comparing adjacent pixels represented in each digitizing channel and for summing differences in levels over many frames, and where an accumulated difference is used as a feedback signal to drive such summing to a minimum;

wherein, the adjustment is such that said black level is set by temporarily blacking out the imager, and said feedback signal is used to find a balance of black levels between the channels.

2. A multi-tap camera system, comprising:

a multi-tap imager with a plurality of output taps;

a plurality of separate digitizing channels for each imager output tap;

a framegrabber connected to receive separate video data from each of said digitizing channels and able to pixel shift each digitizing channel relative to the others; and a pattern generator for use once during a calibration to generate a test pattern in the digitizing channels that demonstrates to a framegrabber how exactly to restitch the various lanes or zones of a whole image frame back together by pixel shifting.

3. A method for calibrating a multi-tap imager in a camera for use with a framegrabber, the method comprising the steps of:

combining a multi-tap camera and a matching framegrabber together for the first time;

generating a test pattern by injecting its constituent frame parts into a plurality of taps in a multi-tap imager connected to respective channels that include samplers, amplifiers, and digitizers; and setting a restitching by a framegrabber of the test pattern to eliminate bit shifts in lines and rows wherein, setting said restitching once for the particular combination of said multi-tap camera and a matching framegrabber is a permanent calibration.

* * * * *